United States Patent
Pinault et al.

(10) Patent No.: US 9,191,337 B2
(45) Date of Patent: Nov. 17, 2015

(54) METHOD OF PROVIDING DATA TO REPRESENT THE VALUE OF AVAILABILITY OF A PLURALITY OF RESOURCES

(75) Inventors: Francis Pinault, Courbevoie (FR); Guerric Faure, Marignane (FR)

(73) Assignee: WHOOG, Marignane (FR)

( * ) Notice: Subject to any disclaimer, the term of this patent is extended or adjusted under 35 U.S.C. 154(b) by 426 days.

(21) Appl. No.: 13/823,938

(22) PCT Filed: Sep. 22, 2011

(86) PCT No.: PCT/FR2011/052188
§ 371 (c)(1),
(2), (4) Date: Mar. 15, 2013

(87) PCT Pub. No.: WO2012/042152
PCT Pub. Date: Apr. 5, 2012

(65) Prior Publication Data
US 2013/0179579 A1    Jul. 11, 2013

(30) Foreign Application Priority Data
Sep. 29, 2010   (FR) ................................. 10 03850

(51) Int. Cl.
*G06F 15/16* (2006.01)
*H04L 12/911* (2013.01)
*H04L 29/08* (2006.01)
*H04L 29/06* (2006.01)
*G06Q 99/00* (2006.01)

(52) U.S. Cl.
CPC ............... *H04L 47/70* (2013.01); *G06Q 99/00* (2013.01); *H04L 29/06* (2013.01); *H04L 29/08072* (2013.01)

(58) Field of Classification Search
CPC .......................... H04L 29/08072; H04L 29/06
USPC .................. 709/203, 220, 228; 370/252, 235
See application file for complete search history.

(56) References Cited

U.S. PATENT DOCUMENTS

| | | | |
|---|---|---|---|
| 6,446,239 B1* | 9/2002 | Markosian et al. | 716/122 |
| 8,395,993 B2* | 3/2013 | Kimmich et al. | 370/235 |
| 2008/0288889 A1* | 11/2008 | Hunt et al. | 715/810 |
| 2012/0069752 A1* | 3/2012 | Larocque et al. | 370/252 |
| 2015/0119697 A1* | 4/2015 | Penn | 600/420 |

OTHER PUBLICATIONS

International Search report dated Nov. 14, 2011.
Notice from the European Patent Office dated Oct. 1, 2007 concerning business methods.

* cited by examiner

*Primary Examiner* — Khanh Dinh
(74) *Attorney, Agent, or Firm* — Sofer & Haroun, LLP (57) ABSTRACT

A method is provided for supplying data to represent the availability value of a plurality of resources that includes receiving a request for presentation of an availability value for a plurality of resources and determining at least two resources having representative values that can be received, two representative values are received each corresponding to a respective one of the two resources and supplying data to represent the calculated availability value. The method includes receiving two criticality coefficients corresponding to the two resources, and calculating the availability value from the two representative values and the two criticality coefficients.

20 Claims, 2 Drawing Sheets

METHOD OF PROVIDING DATA TO REPRESENT THE VALUE OF AVAILABILITY OF A PLURALITY OF RESOURCES

RELATED APPLICATIONS

This application is a National Phase Application of PCT/FR2011/052188, filed on Sep. 22, 2011, which in turn claims the benefit of priority from French Patent Application No. 10 03850 filed on Sep. 29, 2010, the entirety of which are incorporated herein by reference.

BACKGROUND

1. Field of the Invention

The invention relates to the field of telecommunications between users, and more particularly the field of supplying a system with means for extending the concept of the availability of a user of a mobile or fixed network.

2. Description of Related Art

Numerous situations in the world of telecommunications make use of the concept of the presence of a user of a mobile or fixed network.

Such concepts are in widespread use in applications such as Windows Live Messenger, GoogleTalk, AIM, or Pushchat. Those applications make it possible for the presence of a first user to be shown in a list of contacts, thereby enabling contact to be made with that first user if some other user seeing that list of contacts so desires, with the first user's availability being visible in the list.

Such presence defines a logical or physical state of the connection between the user and a network and/or of the user's desire to specify availability. The most frequent states that are determined by systems or indicated by users are the following:
  Available
  Not connected
  Busy
  Unavailable.

Those availability states may be accompanied by messages provided by the user, making it possible to specify a special situation to people consulting that user's status, for example "on holiday" or "driving".

In more advanced manner, the system may make available a method for indicating a user's preferences for communicating. This enables the user to specify that short message service (SMS) messages are preferred on a mobile telephone while voice type conversations using the Skype application, for example, are preferred on a computer.

That type of operation is particularly well developed by the Pushchat application from the supplier Pushmessenger that enables a user to be connected to the service via a plurality of distinct terminals. U.S. Pat. No. 7,469,045 describes a method of that type.

Very recently, and in particular in association with the appearance of equipment that enables the positions of terminals to be located by the global positioning system (GPS), users of such applications that already make use of presence can also be located and they can communicate their locations to third parties.

The user of one of the above-mentioned applications can thus be informed about the real or chosen state of availability of a given user, with that user's preferences for communication and with that user's location, whether in a fixed situation or a mobile situation.

OBJECTS AND SUMMARY

A problem that arises generally in the known state of the art is that of improving knowledge about a user's availability state.

For this purpose, the invention provides a method of supplying data to represent the availability value of a plurality of resources, the method comprising the steps consisting in: receiving a request to present an availability value of a plurality of resources, determining at least two resources forming part of said plurality of resources and having representative values that can be received, receiving a representative value for the first resource of said at least two resources, receiving a representative value for the second resource of said at least two resources, and supplying data to represent said availability value calculated in response to said presentation request, the method being characterized in that it also includes the steps consisting in receiving a first criticality coefficient of said first resource, of receiving a second criticality parameter of said second resource, and of calculating said availability value from said first and second representative values and said first and second criticality coefficients.

Preferably, at least one of said representative values forms part of the group of values representing: the available remaining capacity of the battery of the mobile equipment of a user; the distance between a user and the place where said application is used; longitude or latitude data enabling said user or said place where said application is used to be located; locomotion means available to said user, either by said user specifying said locomotion means or by said means being deduced from the travel speed of said user; and an indication of said user's ability to provide the expected help in providing help in terms of health, violence, listening, or assistance in everyday actions.

Advantageously, said calculation involves a linear combination or the product of a first product and a second product, said first product being the product of said first representative value multiplied by said first criticality coefficient and said second product being the product of said second representative value multiplied by said second criticality coefficient.

The method may also be such that said step of receiving a criticality coefficient follows a step of inputting said criticality coefficient.

The method may also be such that the step of representing said data represents said availability value in a form that forms a part of the group comprising a numerical value, a pictogram, a color, a sound, and a combination of some or all of the elements in this group.

The method may also be such that at least any one of the steps is triggered by a person or by an event or is repeated automatically in periodic or non-periodic manner.

The method may also include an acquisition step of using replies made to a questionnaire to acquire a said criticality coefficient or to calibrate a representative value.

The method may be such that said acquisition step may be performed when registering with the service or by importing other data coming from at least one data server.

The invention also provides a system for presenting an availability value of a plurality of resources, the system comprising an application server capable of: receiving a request to present an availability value of a plurality of resources; determining at least two resources from said plurality of resources having representative values that can be received by said application server; receiving a signal via a first link, first communications means, and a second link, which signal contains a first representative value of the first resource from among said at least two resources; receiving a signal via a third link, second communications means, and a fourth link, which signal contains a second representative value of the second resource from among said at least two resources; and supplying data via a fifth link to represent said availability value calculated in response to said request for presentation; the system being characterized in that it further comprises: a database capable of delivering a first criticality coefficient to said application server via a sixth link, the first criticality parameter corresponding to said first resource; said database also being capable of delivering a second criticality coefficient to said application server via said fifth link, the second criticality parameter corresponding to said second resource; and said application server being capable of calculating said availability value from said, first, and second representative values and said first and second criticality coefficients.

The system may be such that said first and second communications means are the same means.

The system may also be such that said second and fourth links are the same links.

The system may be such that said database includes a server supporting an application of the social networking or instant messaging type such as Facebook or Gtalk or AIM or Pushmessenger or Microsoft Live Messenger.

The system may be such that said availability value is not accessible to all of the users of said method or of said system.

The method may also include a step of verifying authorization before supplying data representing the availability value.

The method may be triggered by a step of updating at least one of said criticality coefficients.

The method may be such that said event is receiving external data.

The method may be such that said external data forms part of the group comprising: the result given by a formula serving to calculate a length of time at the end of which one or more steps of said method are to be performed; a list of events associated with one or more steps of said method; or a combination of these kinds of data.

The system may also be such that at least one of said application server and said database form part of a public or private communications network involving wired or wireless connections.

The method or the systems may be such that said representative values or said criticality coefficients take on integer values in the range 0 to 9.

The method may be such that said calculation also includes at least one division.

The method may also include a representation step using said data supplied for representing said availability value, said representation step consisting in representing said availability value in a form, that forms part of the group comprising: a sound, an image, a sequence of images, a vibration, a temperature, an electric voltage, an electric current, and a combination of two or more of these forms.

The method may also be such that said representation step depends on said authorization.

BRIEF DESCRIPTION OF DRAWINGS

The invention can be better understood and other objects, details, characteristics, and advantages thereof appear more clearly from the following description of particular embodiments of the invention given purely by way of non-limiting illustration and with reference to the accompanying drawings.

In the drawings.

DETAILED DESCRIPTION

Figure 1:
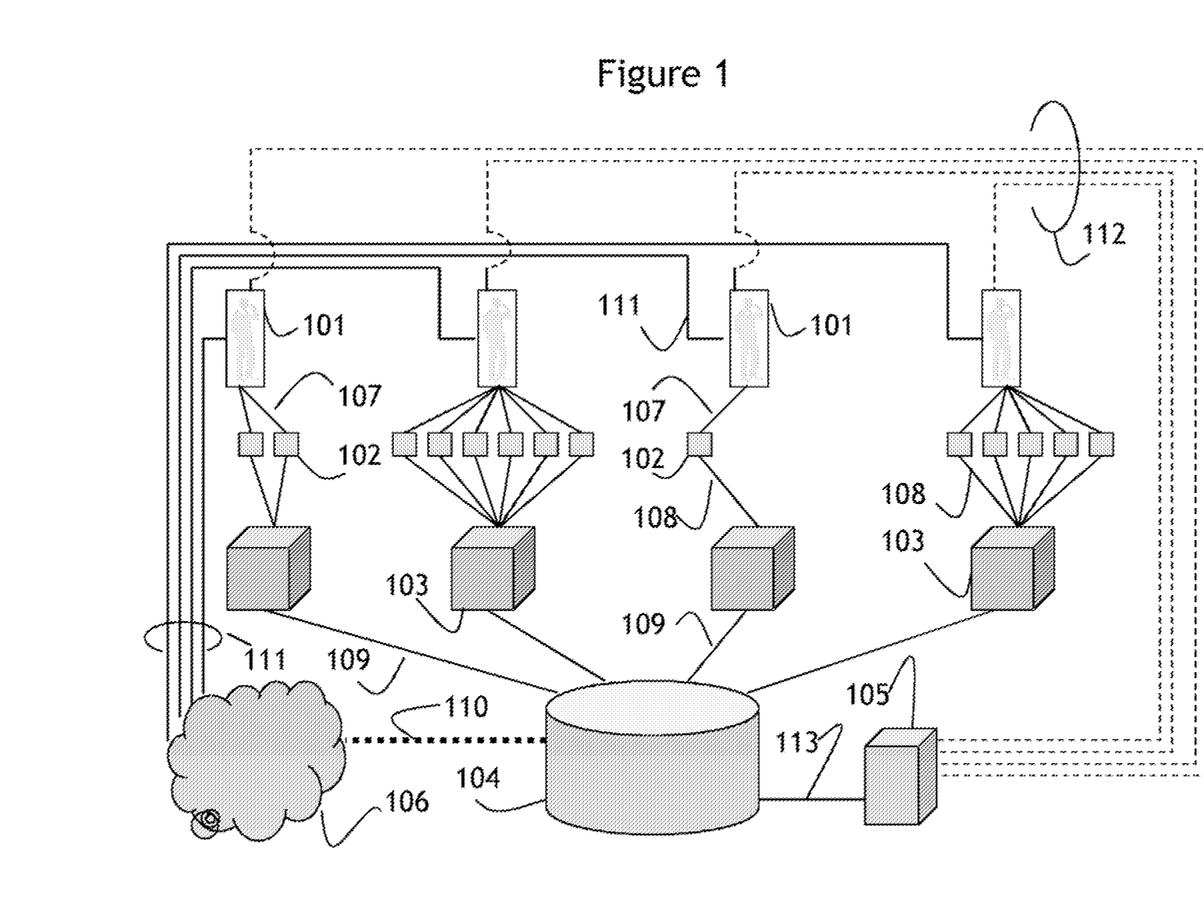
FIG. 1 is a diagram of a switching network in an implementation of the invention.

In FIG. 1, reference 101 designates a plurality of users. Each user has resources 102 available.

Links 107 show diagrammatically the user 101 to which each resource 102 is attached. Attachment 107 may be physical or logical. By way of example, a physical attachment may be wired or wireless, e.g. a radio link or an optical link. A logical attachment of means 102 to a user 101 may for example be a credit card number or a telephone number or indeed an email address. Other types of attachment are possible.

In FIG. 1, the communications means 103 are capable of receiving information over the links 108 relating to the physical or logical states of resources 102. In this description, the term "representative value" written Vr, is used to designate a physical or analog value representing the physical or logical state of a resource 102. The communications means 103 are capable of receiving representative values Vr from means 102 via the links 107 and of transmitting those values by means of signals to a server 104 via links 109. By way of example, the signals may be radio or optical signals or they may be a combination of both types of signal.

In FIG. 1, the server 104 is also capable of receiving data stored in a database 105 via a link 113. The links 108, 109, and 113 may be of numerous kinds implementing some or all of the following: wired links; wireless links; a telecommunications network; and a plurality of telecommunications networks.

As a first example, a resource 102 may be constituted by a piece of mobile equipment that enables a user to be reached in an emergency, for example. The availability of this resource is given by a representative value Vr. In this example, Vr represents the available remaining capacity of the battery of the mobile equipment as indicated by the terminal, and it may be expressed as a percentage of the total capacity of the battery of the terminal. For example, in order to recover information about the remaining battery capacity of the terminal, the 3GPP standard defines a method making it possible using the GSM protocol or the UMTS protocol for mobile networks together with the SIM application tool kit (SATK) application to interrogate the terminal in a manner that is transparent to the user of said terminal and to recover such a value in the server that has requested it. Other characteristics of the terminal such as its brand and its model can also be obtained using that method. Such information is nevertheless not fully representative of the availability of the resource constituted by the mobile terminal. For example, if it is necessary for there to remain 5% of the capacity of a particular mobile terminal in order to provide the 5 minutes of voice communication that are essential for one given service, it can happen that a capacity of 10% might be necessary on another mobile terminal; likewise if communication is to be established in the form of a video link, then the percentages required will be much greater for each of the two terminals in question, while probably still remaining different between them. Furthermore, even though a residual capacity of a battery of a mobile terminal is expressed as a percentage of the maximum capacity of the battery, that percentage is not genuinely representative of the availability of the resource constituted by that mobile terminal. The problem remains the same if the residual capacity of the battery of a mobile terminal is expressed in milliamp-hours (mAh). The unit in the international system (SI) is the coulomb, however amp-hours are tolerated for specifying the capacity of batteries, rechargeable or otherwise. In a preferred example of the method, a representative value Vr is used, which value is expressed as an integer in the range 0 to 9. By way of example, the value 1 may present a minimum capacity giving no guarantee of being able to establish communication and sufficing at best to receive a short message service (SMS) message. The value 9 may represent the capacity to establish communication using both voice and video. The person skilled in the art can define the meanings of such representative values Vr firstly on the basis of information about the residual battery charge (e.g. expressed as a percentage or in mAh) and secondly on the basis of the type of communication desired (SMS, voice, etc.). There are multiple ways of defining the meanings of the values that can be taken on by a representative value Vr. To do this it is necessary to perform a calibration step. The calibration may be obtained by performing tests, e.g. to verify whether a given terminal with a battery presenting a given residual charge is capable only of receiving an SMS or of communicating by voice. The meanings of representative values Vr therefore depend on calibration. A representative value Vr need not necessarily be an integer. To simplify, in the proposed example, the representative values $Vr_k$ come from the means 102. In the proposed example, the calibration means are thus located in the resources 102.

In another example (not shown in detail in the present description), the calibration means may be distributed over the resource 102, the transmission means 103, the server 104, or indeed other means. A user may also contribute to calibration. In this example that is not shown in detail, the resources may for example provide a physical measurement and the representation $Vr_k$ is constructed by all or some of the resource 102, of the transmission means 103, of the server 104, and indeed of other means. The result of the calibration and the elements that enable it to be defined are stored in the server 104. The server 104 is the server of an application that makes use of resources 102, in particular the resource constituted by the mobile terminal in question of a user 101 of the application.

Below, in order to simplify this value representative of the available remaining capacity of the battery, written $Vr_1$, it is assumed that the value may be expressed as an integer number in the range 0 to n, where n is an integer greater than 0. Other conventions could be used.

In another example, the resource 102 under consideration may be the ability of a user of the application to travel the distance between that user and another user of the application. The meaning of a calibration of representative values Vr on a scale of 0 to 9 then depends on the importance given to the time needed to travel said distance. If the application is one in which urgency is a criterion, for example for medical assistance, a representative value of 9 means that the two users (the patient and the doctor) are both present in the same room (e.g. less than ten meters apart), whereas the value 1 may represent a distance of several kilometers, indicating that a resource is not very available, in terms of providing medical assistance. In contrast, for an application that does not present an urgency criterion, e.g. the need to buy food for an elderly person, a representative value of 9 may represent a distance of several tens of kilometers between the two users (the elderly person and the person providing shopping assistance). A value Vr of 1 when applied to availability for providing shopping assistance may correspond to a distance of several thousand kilometers. Once more, the person skilled in the art is capable of defining a multitude of correspondence rules, i.e. calibration rules between the distance and the representative value representing that distance in a manner that reflects the need that is being addressed. The representative value may be a linear function of distance, or even in the simplest situation that distance itself. The distance information may also be determined indirectly by geographical coordinates (longitude, latitude, etc.) supplied by the two terminals, each terminal being carried by a respective one of the two users. Numerous means may be used for calculating a representative value $Vr_k$ involving a distance. Conventionally, the person skilled in the art uses presence servers in order to recover logical or physical information associated with the state of a connection. This applies for example in known applications such as Windows Live Messenger from the supplier Microsoft or indeed Pushchat from the supplier Pushmessenger. In order to obtain the distance between the terminal for which it is desired to calculate an availability value $Vr_k$ and some other terminal, it is possible to use known geo-location methods for calculating the position of each of said terminals. Usable geo-location methods include for example WiFi triangulation or the method based on "cell-id", i.e. the identities of cells in cellular networks, or in more pertinent manner, coordinates determined by means of the GPS system or the GALILEO system, for example. Position difference calculations can be performed easily and serve to give the distance involved in calculating a representative value $Vr_k$ concerning the availability of a resource. Another method might be to use an application from the suppliers MAPPY or TOMTOM serving to calculate an itinerary and thus directly providing the travel time and/or distance between two addresses or positions. Other methods of calculating distances are known. The person skilled in the art the knows how to perform the conversions and the calculations needed for determining a distance value and then to use that value to determine the representative value that is appropriate for the application in question.

Below, and in order to simplify matters, it is assumed that the representative value for the distance between two users of the application is written $Vr_2$ and given on a scale of 0 to m, where m is an integer greater them zero. Representative values $Vr_2$ and their meanings are stored in the server 104.

In a third example, a representative value relates to the availability of a transport resource for a user of the application in order to go to another user of the application. Determining a representative value $Vr_k$ relies on knowledge of the nature of a transport resource, then the available transport means may be indicated by the user having that resource. For example, the transport may involve walking, or using a bicycle, a motorbike, a car, a bus, a metro, etc. The nature of the resource constituted by the transport means may alternatively be deduced by calculating the travel speed as a result of tracking the user being transported by said resource by using geo-location. For example, if the travel means involve a calculated speed greater than 30 kilometers per hour (km/h) taking place on roads, it can be deduced that the means for locomotion are motor-driven (motorbike, car, bus, etc.). Conversely, if the mean travel speed is less than 5 km/h but not zero, then the person's terminal is considered as being carried by that person while acting in pedestrian mode. If the mean travel speed is zero or practically negligible, that means that the position is practically fixed without it being possible to draw any conclusion about the locomotion means that are potentially being used.

The representative values may take integer values in the range 0 to 9. The meanings of these values are likewise established by rules set by the person skilled in the art. Thus, 1 may represent mobility that is slow because the locomotion means are a car and the distance to be traveled, obtained by geo-location, leads to a long time. This time may be provided, by known applications that, provide travel time as a function of the vehicle or of the type of road, such as the commercial mapping application or such as the "itinerary" function of a TOMTOM GPS. The calculated time, e.g. as calculated by a TOMTOM GPS, may also take account of real traffic. Thus, transport means intended to make it possible to travel a given distance, may constitute a poor resource in a built-up area, or on the contrary a good resource in a rural area having roads that are clear. In this example, the values representative of the availability of the transport means may take respective values of 1 and 9. Below, in order to simplify matters, it is assumed that the value representative of transport means is written $Vr_3$ and can take integer values on a scale of 0 to $p$, where $p$ is an integer greater than zero.

Other values representative of the availability of a resource for one or more users may also be calibrated by the person skilled in the art, as a function of the applications that make use of those resources. Thus, an indication concerning ability to take action with certain problems such as health, violence, listening, or indeed providing assistance in everyday acts such as mobility, washing, dressing, reading, etc. constitutes as many representative values written $Vr_k$ that can be stored by the server 104, where $k$ is an index representing a particular representative value.

In another example, a representative value $Vr_k$ concerning the availability of a resource may measure the ability of a person to take action with certain problems. Thus, an input questionnaire may be made available when acquiring personal data for the application that uses the server 104, and it may present questions of the type:

"Have you attended first aid training?"
"Do you have a first aid certificate?"
"Have you had medical training?"
...

For first aid assistance, the application can then determine a corresponding representative value $Vr_k$.

In another implementation, data acquisition may be performed directly as a function of making a choice amongst levels set out in a list of the following type:

| Level | Description of your ability to provide assistance |
|---|---|
| 0 | No ability to provide first aid or assistance to people |
| 1 | Capable of providing assistance: giving medication, meals to healthy people |
| 2 | You have level 1 and you can provide assistance to people with difficulties in mobility or concentration |
| 3 | You have level 2 and you can provide assistance in washing/dressing |
| 4 | You have level 2 and you have attended first aid training |
| 5 | You have level 2 and you hold a first aid certificate |
| 6 | You have level 3 and you have received medical training |
| 7 | You have level 6 and you have a nursing diploma |
| 8 | You have level 6 and you are a doctor |
| 9 | You have level 6 and you are an emergency service worker |

The representative values $Vr_k$, whether collected, or on the contrary set by default when they cannot be determined, are stored in the database referenced by the number 105 in FIG. 1. In order to make these values easier to use, a preferred implementation of the method makes use of values on a scale of 0 to 9.

Depending on the intended application, the method advantageously gives each representative value a corresponding criticality coefficient that represents the criticality of the representative value for the application. Criticality coefficients $Cr_k$ are stored in the database 105. A criticality coefficient is written $Cr_k$, where $k$ is an index specifying the corresponding representative value $Vr_k$. The representative values $Vr_k$, are as defined above. A criticality coefficient $Cr_k$ takes the value of 9 on a scale of 1 to 9 to indicate maximum criticality for the intended application, whereas a value of 0 for $Cr_k$ indicates that the state of the corresponding resource has no influence on the intended application.

As stated above, criticality coefficients $Cr_k$ depend on the intended application. By way of example, the table below gives values for criticality coefficients $Cr_k$ as a function of representative values $Vr_k$ (rows of the table) and for three applications (columns of the table). These three applications are specified below by the terms: assistance to the elderly (ATTE); assistance to a person threatened by violence (APDV); and assistance to a slightly handicapped person requiring occasional help (ADOH).

| Resource | ATTE | APDV | ADOH |
|---|---|---|---|
| Logical or physical state | 8 | 3 | 3 |
| Mobile terminal battery capacity | 8 | 5 | 3 |
| Distance | 3 | 8 | 8 |
| Locomotion means | 5 | 5 | 8 |
| Ability to intervene | 3 | 8 | 1 |

In this table, the criticality coefficients $Cr_k$ of a given resource may present values that differ as a function of the application. For example, for the APDV application of assisting a person in danger of violence, the value of the criticality coefficient $Cr_k$ associated with the distance resource is 8. It is understandable that this value of 8 is higher than the value 3 that corresponds to the criticality coefficient that is associated with the same distance resource but for an ATTE application relating to providing assistance to the elderly. These tables of values for criticality coefficients may be filled in automatically as a function of the type of application involved. A user may also select values for these coefficients when creating a profile by using a link 112 as shown in FIG. 1. The values of criticality coefficients $Cr_k$ may also be proposed in the manner explained for the representative values $Vr_k$, by means of questions. An example is given below for values of criticality coefficients $Cr_k$ concerning the distance parameter.

"Do you think that the distance to the person who is to remain in contact with you is:
 1. Vital
 2. Crucial
 3. Very important
 4. Fairly important
 5. Less important than other factors such as ability to answer the telephone or the qualifications of the person in contact?"

The application then determines the value for the corresponding criticality coefficient $Cr_k$, for example the application will give the value 9 for the response "Vital", 8 for the response "Crucial", 6 for "Very important", 4 for "Fairly important", and 2 for the last option.

This acquisition of criticality coefficients $Cr_k$ may also be performed directly by asking for a selection to be made in a list of the following type:

| Level | Description of your assessment of the importance of the distance between the people in contact |
|---|---|
| 1 | Not important |
| 2 | Not very important |
| 3 | Fairly important |
| 4 | Important |
| 5 | Very important |
| 6 | A short distance is essential |
| 7 | The distance must be very short, there may be danger |
| 8 | The distance is vital |
| 9 | The distance is crucial |

A value of 0 for the criticality coefficient $Cr_k$ may be reserved for when the distance is unknown.

Once the coefficients Cr have been determined and are stored in the database 105, a computer situated in the server 114 proceeds to multiply the representative value $Vr_k$ by the corresponding criticality $Cr_k$ in order to calculate the products $Vr_k*Cr_k$.

In FIG. 1, a plurality of users 101 are connected to the server 104 via the communications network 106 and the links 110 and 111. This enables the users 101 to have access to the application provided by the server 104. To simplify the figure, only one communications network 106 is shown. In a different implementation, the users 101 could make use of different networks 106 that are not shown. The links 110 and 111 may be wired or wireless. In another implementation, certain users may be connected to the server 104 via a point-to-point link provided by analog links to the links 110 and 111 without having recourse to any communications network 106.

In FIG. 1, the users 101 are connected to the database 105 by links 112. The links 112 may be physical (permanent or temporary) or logical (e.g. a subscription contract). The users 101 record in the database 105 the resources 102 that they have available. In one implementation, the users 101 define the access rights they desire to give other users 101 concerning consultation of the representative values Vr of those resources.

On the basis of the representative values $Vr_k$ received by the server 104 from the resources 102, and of the criticality values $Cr_k$ received by the server 104 from the database 105, a user 101 may use the application in question to calculate an availability value. The availability value Vd is calculated by a processor of the server 104. This calculation involves adding the products $Vr_k*Cr_k$ of the representative values $Vr_k$ multiplied by the corresponding criticality coefficients $Cr_k$. The application in question then uses a processor situated in the server 104 to calculate an availability value in the form given by equation (1).

$$Vd = \sum_{k=1}^{k=p} Vr_k * Cr_k \quad (1)$$

In another implementation, the availability value is calculated from the product of the products $Vr_k*Cr_k$, in the form given by equation (2).

$$Vd = \prod_{k=1}^{k=p} Vr_k * Cr_k \quad (2)$$

In a third implementation, the availability value Vd is obtained from the product of the pairs $Vr_k*Cr_k$ while excluding from the product those products for which at least one of the values $Cr_k$ or $Vr_k$ is zero.

In equations (1) and (2), the upper limit of integration for the parameter k represents the number of means 102 taken into account for determining the availability value Vd. For example, an availability value Vd may be calculated from three means (integration limit equal to 3), involving battery charge of a mobile telephone, a distance, and transport means. Vd is then calculated on the basis of representative values $Vr_1$, $Vr_2$, and $Vr_3$, and on the basis of corresponding criticality coefficients $Cr_1$, $Cr_2$, and $Cr_3$.

If a large availability value Vd is obtained, that means good availability for the intended application, while a small availability value Vd means poor availability.

When it has not been possible to supply representative values $Vr_k$ to the server 104, e.g. because a mobile terminal is not capable of transmitting its remaining battery capacity to the server 104, a default value is given to the representative value $Vr_k$, or else the corresponding pair $Vr_k$, $Cr_k$ is not taken into consideration when calculating Vd.

In an implementation, the calculated availability value Vd is a data item that is supplied for building a representation RVd of the availability value. A representation of the availability value, RVd, may be presented on a terminal that is available to one or more users. To simplify, it is assumed that such a terminal forms part of the resources 102 available to said users. Nevertheless, such a terminal could be distinct from the resources 102. A terminal for a representation of the availability value may be available to only one user 101 or it may be shared by several users 101. The representation RVd of the availability value is such that it makes it easier for that or those users to be aware of the availability value Vd. Thus, if the calculated availability value Vd is a large number, it might be difficult for a user to interpret directly. For example, if the determined representative values $Vr_k$ are 5 in number and if the criticality coefficients $Cr_k$ for applying respectively thereto have a maximum, value of 9, the availability value Vd may take a value lying in the range 0 to 45. Such a range of values is difficult to interpret directly. A representation RVd of the availability value may be obtained by performing integer division on the availability value Vd so as to obtain a representation RVd of the availability value that lies on a smaller scale, e.g. from 0 to 9.

In another implementation, the representation RVd of the availability value is a color. By way of example, red may be synonymous with prohibition, i.e. that the application has detected non-availability. In an implementation of the method, the availability values Vd may be represented on a scale of 0 to 9 by ten colors.

| Value of Vd as reduced to a range 0 to 9 | Color representative of availability |
|---|---|
| 0 | Red |
| 1 | Red |
| 2 | Orange |
| 3 | Yellow |
| 4 | Gray |
| 5 | Gray |
| 6 | Pale blue |
| 7 | Blue |
| 8 | Pale green |
| 9 | Green |

Other representations may be used, e.g. words uttered by a voice, other audible symbols, icons, images, etc.

A representation RVd of an availability value may also be enriched with a representation on a map locating the corresponding resource or on a symbolic representation of the network connecting the users of the application. If this representation is an icon, it may be positioned on the place on the map that locates one of the users of the application.

In other implementations, it is possible to use man/machine interfaces that already exist in the terminal. Thus, an iPhone terminal from the supplier Apple may use its zoom or magnifying glass to specify the person whose availability value Vd is to be discovered. This may be done in association with a particular sound or visual signal being generated.

In an implementation, profiles of the users 101 are recorded in the database 105 via the links 112 shown in FIG. 1. Such a profile specifies in particular the type of application that is of interest to each user. The server 104 receives user profile information from the database 105 via the links 113, thus enabling it to perform the requested service, in particular by interrogating appropriate communications means 103, In an implementation, the server 104 and the database 105 have means for updating their data, e.g. via the network 106 and the links 110 and 113. The network 106 may be a public or private network and may perform updating on request or periodically.

For reasons of clarity, FIG. 1 does not show other elements that might be present for performing certain implementations. These may be telecommunications equipment suitable for setting up voice or data type calls, a public or private communications network, management means suitable for acquiring data relating to the health of a user, the state of a piece of telecommunications equipment, means for locating people or pieces of equipment, etc.

Numerous management systems may be used in order to manage the network of FIG. 1. Advantageously, certain implementations may manage notions of ownership and authorization relating to the data or to the means for updating the data in the database 105, or to the calculation means available to the computers present in the server 104. Thus, the database 105 may contain data belonging to different groups of users 101 and the server 104 may provide representations $RVd_k$ of availability values to one or more users belonging to different user groups, providing their profiles stored in the database 105 give them authorization. In the same way, the means for calculating the availability value Vd and the means for constructing the corresponding representation RVd may be situated may be situated in the same server 104, or they may be distributed between the server 104 and a terminal of the user, which terminal may for example be one of that user's resources 107 recognized by the server 104.

In other implementations, numerous characteristics may be taken into account separately and/or in combination, for example:
  updating means capable of acting periodically or on request to update the content of the representative values $Vr_k$, of the criticality coefficients $Cr_k$, of the availability values Vd, and of their representations. Such updating means are preferably located in a server; and
  management means, at least part of which are preferably installed in a management server and possibly containing means for modifying criticality coefficients $Cr_k$ as a function of the intended applications.

The invention may be performed using any type of communications network, which may be public or private, and in particular the Internet, the public land mobile network (PLMN), and the public switched telephone network (PSTN), e.g. the GSM and UMTS public networks, or for example TETRA and RUBIS for private networks.

Figure 2:
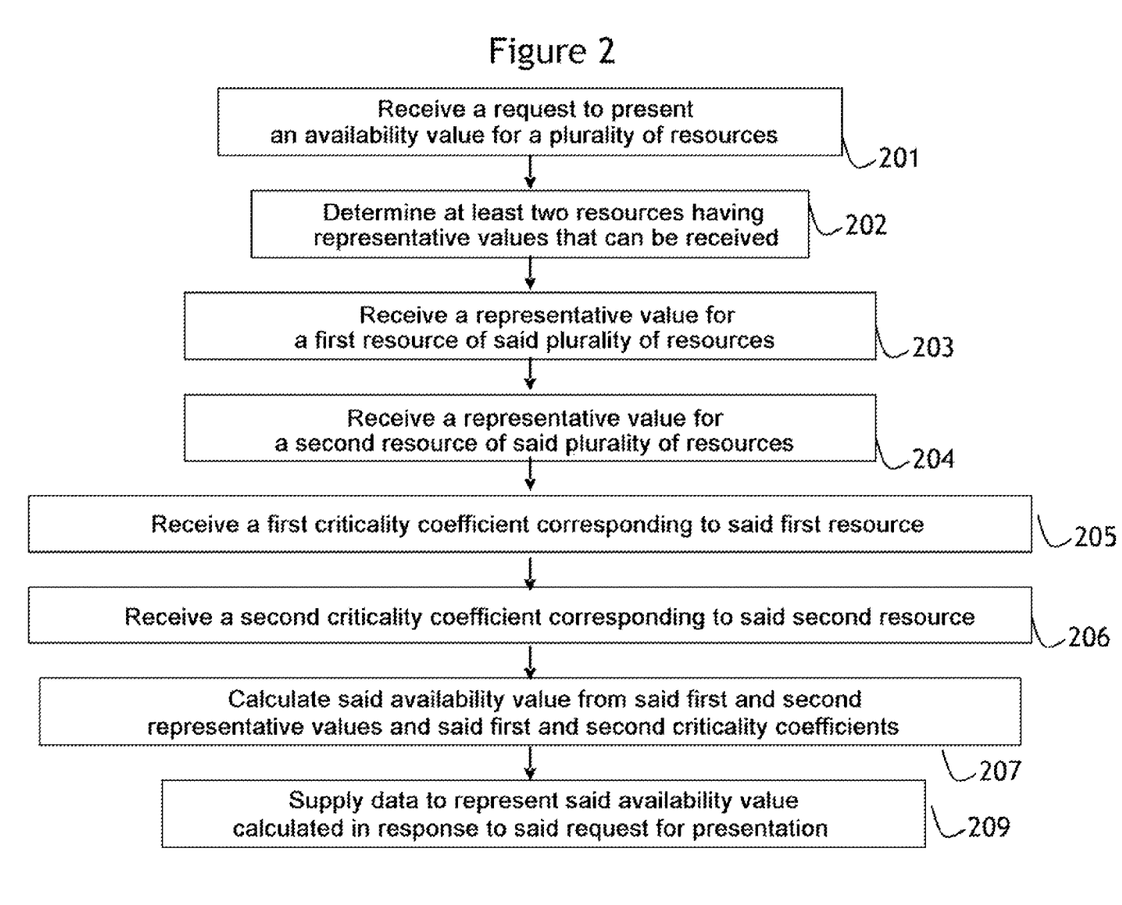
FIG. 2 is a flow chart of an implementation of the method of the invention.

FIG. 2 is a flow chart showing an implementation of a method of presenting an availability value for a plurality of resources. Although the method shows eight steps, other implementations could have some other number of steps or could group together various steps of the method under other names.

Reference 201 designates a step consisting in receiving a request to present an availability value of a plurality of resources. Reference 202 designates a step consisting in determining at least two resources for which representative values can be received. Reference 203 designates a step consisting in receiving a representative value for a first resource of said plurality of resources. Reference 204 designates a step consisting in receiving a representative value for a second resource of said plurality of resources. Reference 205 designates a step consisting in receiving a first criticality coefficient for said first resource. Reference 206 designates a step consisting in receiving a step criticality coefficient for said second resource. Reference 207 designates a step consisting in calculating said availability value on the basis of said first and second representative values and of said first and second criticality coefficients. Reference 208 designates a step consisting in providing data for representing said availability value that has been calculated in response to said presentation request.

The method may be repeated at regular intervals so as to take account of possible variations in the situations affecting the representative values, or in the criticality coefficients, and to do this for all or some of the representative values. Such variation may also apply to the number of resources 107, and thus to the numbers of values $Vr_k$ and $Cr_k$ that are taken into account when calculating Vd.

Step 203 consists in receiving a representative value containing the acquisition of representative values $Vr_k$ associated with data, such as:
  the logical or physical state of the connection between the user and a network and/or the user's availability as specified by the user. The states most commonly provided by existing systems or indicated by users are the following:
  Available
  Not connected
  Busy
  Unavailable;
  the available remaining capacity of the battery of a user's mobile equipment;
  the distance between the user requesting the availability state of another user and that other user, or the geolocation data such as longitude and latitude that enables the distance to be calculated;
  the locomotion means available to the user;
  an indication of the user's ability to intervene for certain problems such as health, violence, listening, or providing assistance in everyday actions such as mobility, washing, dressing, reading, . . . .

The criticality coefficients $Cr_k$ acquired in steps 205 and 206 may be determined beforehand as a function of the characteristic of the intended application, on the basis of data input by the user; the criticality coefficients $Cr_k$ may also be determined by the person skilled in the art and stored in the database, and they may ail so be determined or modified by learning on the basis of experience.

Step 207 is the step in which the products $Vr_k*Cr_k$ are calculated by multiplying the representative values $Vr_k$ by the corresponding criticality coefficients $Cr_k$, and in which the availability value Vd is calculated as the sum or the product of the products $Vr_k*Cr_k$ as specified respectively by equations (1) and (2). When equation (2) is used, it may be appropriate to eliminate zero values.

On the basis of the calculated availability values Vd, step 208 consists in producing a representation RVd of those availability values that depends on the terminal(s) available to the user 101 in FIG. 1. This representation RVd of the availability value may be provided by the server and/or the terminal available to said user after being interpreted in the form of a numerical value, a pictogram possibly associated with a color, and/or sounds or a combination of those forms of presentation.

Various implementations may perform the method of FIG. 2 completely automatically, or completely manually, or both partially automatically and partially manually.

The representation RVd of the availability value may be used in various types of applications, e.g. setting up a micronetwork connecting together a small number of people (users 101 in FIG. 1), one of whom needs to be reassured by viewing representations RVd of the availability values of the other users. For an elderly person, this might enable that person to know whether a nurse, a home help, or his or her children can provide assistance in case of need.

Although the invention is described with reference to several particular implementations, it is clear that it is not limited in any way thereto and that it covers all technical equivalents of the means described and also combinations thereof if they come within the ambit of the invention.

Use of the terms "comprise" or "include" and related forms do not exclude the presence of elements or steps other than those specified in a claim. Unless mentioned to the contrary, the use of the indefinite article "a" or "an" for an element or a step does not exclude the presence of a plurality of those elements or steps. A plurality of units or modules may be represented by a single hardware element.

In the claims, the reference numbers in parentheses cannot be interpreted as limiting a claim.

The invention claimed is:

1. A method of supplying data to represent the availability value of a plurality of resources that are associated with at least one user by a physical or logical link, each of said resources presenting a physical or logical state, and the method comprising the steps of:
   receiving a request to present an availability value for a plurality of resources;
   determining at least two resources, forming part of said plurality of resources, for which the representative values can be received;
   receiving in a database a representative value for the first resource in said at least two resources, at least one of said representative value depending on a measurement of the corresponding resource;
   receiving in said database a value representative of the second resource of said at least two resources; and
   supplying data for representing said availability value calculated in response to said request for presentation;
   wherein the method further includes the steps of:
   receiving in said database a first criticality coefficient corresponding to said first resource;
   receiving in said database a second criticality coefficient corresponding to said second resource; and
   calculating by means of a computer said availability value from said first and second representative values and said first and second criticality coefficients.

2. The method according to claim 1, wherein at least one of said representative values forms part of the group of values representing:
   the available remaining capacity of the battery of the mobile equipment of a user;
   the distance between a user and the place where said application is used;
   longitude or latitude data enabling said user or said place where said application is used to be located;
   locomotion means available to said user, either by said user specifying said locomotion means or by said means being deduced from the travel speed of said user; and
   an indication of said user's ability to provide the expected help in providing help in terms of health, violence, listening, or assistance in everyday actions.

3. The method according to claim 1, wherein said calculation involves a linear combination or the product of a first product and a second product, said first product being the product of said first representative value multiplied by said first criticality coefficient and said second product being the product of said second representative value multiplied by said second criticality coefficient.

4. The method according to claim 1, wherein a said step of receiving a criticality coefficient follows a step of inputting said criticality coefficient.

5. The method according to claim 1, including a step of representing said data representing said availability value in a form that forms a part of the group comprising a numerical value, a pictogram, a color, a sound, and a combination of some or all of the elements in this group.

6. The method according to claim 1, wherein at least any one of the steps is triggered by a person or by an event or is repeated automatically in periodic or non-periodic manner.

7. The method according to claim 1, including an acquisition step of using replies made to a questionnaire to acquire a said criticality coefficient or to calibrate a representative value.

8. The method according to claim 7, wherein said acquisition step may be performed when registering with the service or by importing other data coming from at least one data server.

9. A system for presenting an availability value for a plurality of resources associated with at least one user by a physical or logical link, each of said resources presenting a physical or logical state, the system comprising:
   an application server capable of:
      receiving a request to present an availability value for a plurality of resources;
      determining at least two resources from said plurality of resources having representative values that can be received by said application server;
      receiving a signal via a first link, first communications means, and a second link, which signal contains a first representative value of the first resource from among said at least two resources;
      receiving a signal via a third link (108), second communications means (103), and a fourth link, which signal contains a second representative value of the second resource from among said at least two resources, at least one of said representative values depending on a measurement of the corresponding resource; and
      supplying data via a fifth link to represent said availability value calculated in response to said request for presentation;
   wherein the system further includes:
      a database capable of delivering a first criticality coefficient to said application server via a sixth link, the first criticality coefficient corresponding to said first resource;
      said database also being capable of delivering a second criticality coefficient to said application server via said sixth link, the second criticality coefficient corresponding to said second resource; and said application server being capable of calculating said availability value from said first and second representative values and said first and second criticality coefficients.

10. The system according to claim 9, characterized in that said first and second communications means are the same means.

11. The system according to claim 9, characterized in that said second and fourth links are the same links.

12. The system according to claim 9, wherein said database includes a server supporting an application of the social networking or instant messaging type such as Facebook or Gtalk or AIM or Pushmessenger or Microsoft Live Messenger.

13. The system according to claim 9, characterized in that said availability value is not accessible to all of the users of said method or of said system.

14. The method according to claim 1, further including a step of verifying authorization before supplying data representing the availability value.

15. The method according to claim 6, wherein said event is receiving external data.

16. The method according to claim 15, wherein said external data forms part of the group comprising:

the result given by a formula serving to calculate a length of time at the end of which one or more steps of said method are to be performed;

a list of events associated with one or more steps of said method to be performed; or a combination of these elements.

17. The system according to claim 9, wherein at least one of said application server and said database form part of a public or private communications network involving wired or wireless connections.

18. The system according to claim 9, characterized in that said representative values or said criticality coefficients take on integer values in the range 0 to 9.

19. The method according to claim 3, wherein said calculation also includes at least one division.

20. The method according to claim 1, further including a representation step using said data supplied for representing said availability value, said representation step consisting in representing said availability value in a form that forms part of the group comprising: a sound, an image, a sequence of images, a vibration, a temperature, an electric voltage, an electric current, and a combination of two or more of these forms.

* * * * *